United States Patent [19]

Dreher et al.

[11] Patent Number: 4,531,431
[45] Date of Patent: Jul. 30, 1985

[54] METHOD AND DEVICE FOR CONTROLLING A MOTOR VEHICLE POWER UNIT

[75] Inventors: Gunther Dreher; Gerald Lexen, both of Munich, Fed. Rep. of Germany

[73] Assignee: M.A.N.-Maschinenfabrik Augsburg Nurnberg, Munich, Fed. Rep. of Germany

[21] Appl. No.: 449,193

[22] Filed: Dec. 13, 1982

[30] Foreign Application Priority Data

Dec. 24, 1981 [DE] Fed. Rep. of Germany ....... 3151351

[51] Int. Cl.³ .................. B60K 41/12; B60K 41/18
[52] U.S. Cl. ........................ 74/866; 74/872; 60/431; 60/438
[58] Field of Search .................. 74/866, 872, 874; 60/711, 718, 431, 438

[56] References Cited

U.S. PATENT DOCUMENTS

| | | | |
|---|---|---|---|
| 3,665,788 | 5/1972 | Nyman | 60/438 X |
| 3,969,896 | 7/1976 | Louis | 60/431 |
| 4,102,131 | 7/1978 | Reynolds et al. | 60/431 |
| 4,220,059 | 9/1980 | Mizuno et al. | 74/866 X |
| 4,346,625 | 8/1982 | Latsch et al. | 74/866 X |
| 4,353,272 | 10/1982 | Schneider et al. | 74/872 X |
| 4,428,257 | 1/1984 | Meyerle et al. | 74/866 |
| 4,445,329 | 5/1984 | Drisko | 60/431 |

FOREIGN PATENT DOCUMENTS 2811574 9/1979 Fed. Rep. of Germany .
2843256 4/1980 Fed. Rep. of Germany .

Primary Examiner—George H. Krizmanich
Assistant Examiner—Dirk Wright
Attorney, Agent, or Firm—Scully, Scott, Murphy and Presser

[57] ABSTRACT

Method and device for controlling a motor vehicle power unit consisting of an internal combustion engine and a variable-ratio power divider transmission. For adjusting the output, use is made of the data from the only sensor sensing the speed at the transmission output end, and from the accelerator and brake pedals. The resultant reference value is directly transferred to an engine function generator in which engine characteristics are stored. The output signal from the engine function generator is used to control the throttle or the fuel supply system actuating lever. The reference generator also directly influences a speed function generator, in which the optimum speed is stored. Its output signal is linked with the indication from the sensor so as to form a reference value for the transmission ratio and is processed in a transmission control unit for form actuating signals for the transmission.

10 Claims, 3 Drawing Figures

METHOD AND DEVICE FOR CONTROLLING A MOTOR VEHICLE POWER UNIT

BACKGROUND OF THE INVENTION

1. Field of the Invention

The present invention relates to a method and an arrangement for controlling a motor vehicle power unit consisting of an internal-combustion engine and variable-ratio, particularly hydrostatic-mechanical power take-off transmission, wherein the fuel supply to the internal-combustion engine and the transmission ratio are influenced through the intermediary of actuating elements.

2. Discussion of the Prior Art

Control arrangements for motor vehicle power units are presently known. German DE-OS No. 28 11 574 discloses a control requiring switches for selecting among various performance characteristics, depending on the vehicle operating condition, to affect the operation of the throttle or of the injection pump control lever. For example, in order to have a rapidly rising power output available, the angular velocity of the accelerator pedal is additionally measured to enable a changeover to optimum power output control. However, changeover cannot satisfy more than a single optimization criterion at any time.

In a known control arrangement of this type, as shown in German DE-OS No. 28 43 256, the switches are replaced by a so-called cross-controller enabling effectuation of a continual transition between performance-oriented and consumption-oriented optimizations of the operating mode.

However, in this arrangement it is disadvantageous in that flexible and very accurate correlation with different engine and transmission properties is not possible because of the predominantly mechanical-hydraulic operation of the control arrangement.

SUMMARY OF THE INVENTION

Accordingly, it is a basic object of the present invention to provide a method of that type for controlling, with the aid of simple manufacturing means, a motor vehicle power unit for optimum output with a maximally accurate correlation with the different engine and transmission properties.

It is a specific object of the present invention to provide a solution in which, for adjusting the output of the motor vehicle power unit, use is made of the data from a single sensor picking up the speed at the output end of the transmission and from at least one reference transmitter having the form of an operating control, and in which the resultant reference values influence the actuating elements such that the torque of the internal-combustion engine is controlled through the fuel infeed and the engine speed through the transmission ratio.

This renders possible to use the lowest possible number of measurements, in effect, only that of the input speed, in order to operate the power unit of the engine and the transmission for optimized consumption without relinquishing the capability to rapidly increase the output to the maximum, whenever necessary.

Remaining fully considered are requirements arising from the engine performance characteristics and from the transmission characteristics, without necessitating any type of configurational changeover in the control unit.

A further advantage of the invention lies in that the use of a suitable transmission, possibly with an infinitely variable ratio, makes the method of the present invention also suitable for the use of brake energy storage devices, wherein the transmission is used as an actuating element for the input speed.

Moreover, the selected output can rapidly be made available at any time for the reason that the engine performance such as torque, speed is primarily adjusted in accordance with optimum characteristic performance profiles.

The transmission control very rapidly achieves the intended transmission ratio, with full consideration being given to transmission properties, such as switching points, requirement after complete opening of at least one hydrostat to improve the efficiency, and minimization of the power flow transmitted by the hydrostatic branch.

Inasmuch as the method only requires a single sensor, the control can be made extremely robust, for example, when this sensor is redundant.

As reference generators, there can preferably be employed the accelerator pedal and the brake pedal of the vehicle, thus eliminating the need for installing additional operating controls in the vehicle.

In a further aspect of the present invention, the reference value generator acts directly on an engine function generator for the fuel infeed in which there are stored the engine characteristics.

The foregoing permits the operating point of the internal-combustion engine to be accurately correlated and established for optimum consumption as a function of the output requirement.

For this purpose, the engine throttle or the fuel supply control lever of the internal-combustion engine is preferably accordingly actuated by the output signal from the engine function generator.

In yet another aspect of the present invention, the reference value generator acts directly on a speed function generator in which there is stored the optimum engine speed. This enables the control of the engine to be optimized with respect to performance and consumption.

In a still further aspect of the present invention, the output signal from the speed function generator is combined with the measured transmission output speed signal to form a reference value for the transmission ratio.

This enables the reference value to be formed by a rather simple combination of signals. This arrangement also permits the control device to be a modular construction which is divided into an engine control section and a transmission control section. Accordingly, the control device can be constructed so as to conform to any combination of engine and transmission.

Also provided is a transmission control system which computes and produces the actuating signals for the transmission as a function of the reference value signal of the transmission ratio, so that any required transmission ratio can be selected in consideration of the optimum transmission efficiency.

For the engine function generator and the transmission function generator, there can be utilized a common microprocessor which accepts all signals required for control and processes them—linking the stored characteristics—to form set point signals acting directly on the actuating elements.

The use of a microprocessor permits simultaneous sequential operations to be programmed for the transmission ratio. This assists in improving passenger comfort and to avert transmission damage by eliminating unnecessary shifting cycles, especially when gas pedal positions are changed intermittently, during starting or shifting sequences, thus avoiding jerky shifts.

In a further aspect of the present invention, the actuating signals for the transmission ratio are formed from the reference value signal and from signals receiving from the vehicles operator's control panel, and also resulting from the condition of the transmission.

The vehicle operator's requirements are hereby correlated with the condition of the transmission at the moment, so that the vehicle will be controlled in a manner protecting the transmission and maintaining passenger comfort without subtracting from the performance selected by the vehicle operator.

In a further aspect of the present invention the output signal from the speed function generator is combined with the measured transmission output speed signal to form a reference value for the transmission ratio.

Where hydrostatic, mechanical power divider transmissions are used, the actuating signals will affect the pivoting angle of the hydrostats and the couplings of the transmission.

The selection of suitable actuating elements for the fuel infeed and for the transmission can be expanded if the actuating signals are formed through power output steps containing supportive actuating circuits. The supportive actuating circuit serves to correct the actuating signal such that even sluggish actuating elements can be controlled rapidly and accurately.

The method of the present invention is also adapted for utilization with brake energy storage components. In such cases the transmission can very simply be used as an actuating element for the transmission ratio if the power flow of the flywheel is influenced by controlling the change in transmission ratio proportionately to the desired output.

A corrective signal can be added to the reference signal of the transmission ratio in a simple manner to allow for concommitant influences such as temperature, leakage in the hydrostatic branch circuit and vehicle conditions.

The present invention further encompasses an arrangement for controlling a motor vehicle power unit consisting of an engine function generator and a speed function generator, as well as a speed sensor, wherein the function generators are connected at their input ends to operating controls, at their output end they act on engine actuating elements and, through a transmission control unit, on transmission actuating elements, and in which the speed sensor is arranged at the output end of the transmission.

BRIEF DESCRIPTION OF THE DRAWINGS

The accompanying drawings illustrate embodiments of the present invention in a schematic arrangement; in which.

DETAILED DESCRIPTION

Figure 1:
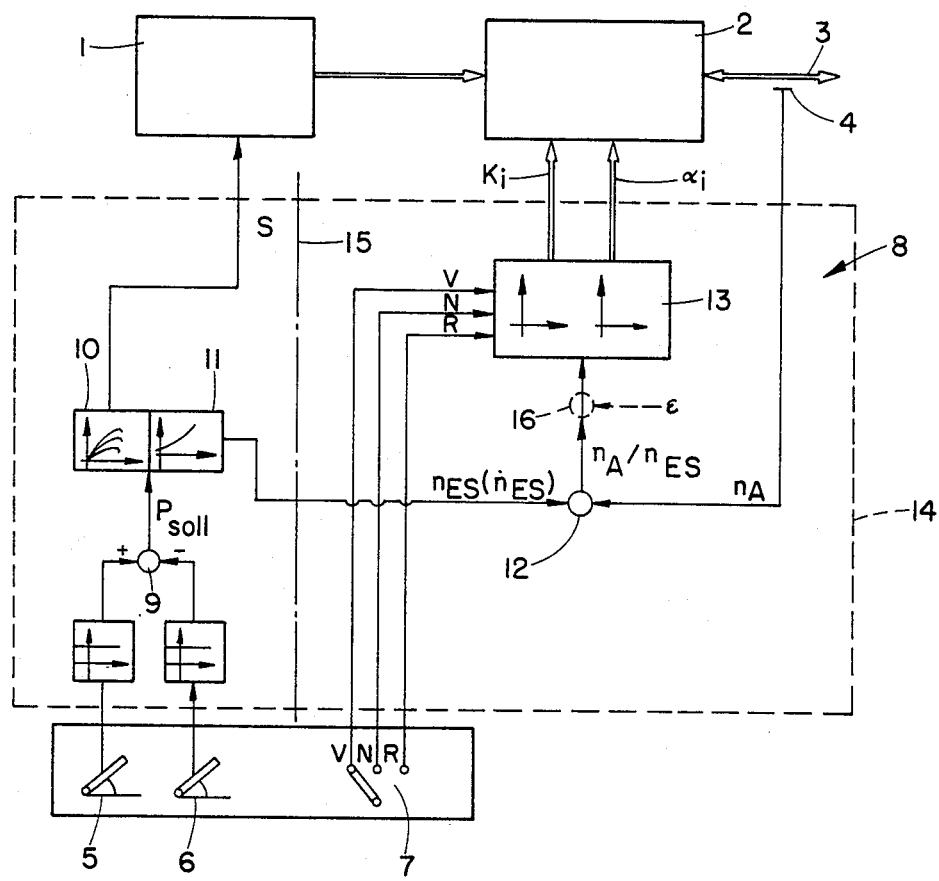
FIG. 1 illustrates a control unit.

FIG. 1 is a block diagram illustrating a motor vehicle power unit consisting of an internal combustion engine 1 and transmission 2.

Arranged at the output end 3 of the transmission 2 is a speed sensor 4. The accelerator pedal 5 and the brake pedal 6, as well as the selector switch 7 for forward V, neutral N and reverse R, serve as reference generators for a control unit 8.

Signals triggered by the position of pedals 5 and 6 are added together at a summation point 9 and are routed as a set point $P_{soll}$ to an engine function generator 10 and a speed function generator 11. Stored in the engine function generator 10 is the characteristic for optimum engine operation. Using the reference value, a control signal S is provided in the function generator 10 in accordance with the engine characteristics so as to control the position of the throttle or the injection pump actuating lever, depending upon the design of the fuel injection system of the internal combustion engine 1.

In the speed function generator there is stored the characteristic for the optimum operation of the engine 1. The reference value $P_{soll}$ received in accordance with the pedal positions, is processed in the speed function generator 11 with consideration to the stored characteristic so as to form an input reference value $n_{ES}$ which is combined in a logic operation 12 with the actual output speed signal $n_A$ from the sensor 4 to thereby form a transmission ratio reference value $n_A/n_{ES}$.

In a transmission control unit 13, which is described more fully below, control signals $K_i$ and $\alpha_i$ acting on the transmission 2 are formed from the transmission ratio reference value $n_A/n_{ES}$ and from signals V, N or R triggered by the selector switch 7. The internal combustion engine and transmission assembly 1,2 provide optimum consumption and performance with this type of control while still achieving the respective output demanded by the vehicle operator, wherein no more than a single sensor (speed sensor 4) is needed.

In an advantageous aspect of the present invention the various elements, shown enclosed by broken line 14, are accommodated within a common housing. This housing can also include a microprocessor for storing all characteristics and performing all logic operations.

The control circuitry 8 lends itself to being divided into two modules which are accommodated in the common housing. The one module shown to the left of the dash-dotted line 15 contains the engine properties, while the second module to the right of the line 15 contains the transmission characteristics. This arrangement permits the combination of modules pursuant to any desirable engine and transmission combination.

The control provisions as described hereinabove are also suitable for vehicles employing the principle of flywheel energy storage, wherein the flywheel energy storage can be incorporated through technically simple additions to the control device 8.

If desired, consideration can also be given to other factors, such as engine temperature or other temperatures, operating condition of the engine or transmission, and vehicle properties, by processing them to form corrective signals E and adding them in a simple manner to the transmission ratio $n_A/n_{ES}$ (16).

Figure 2:
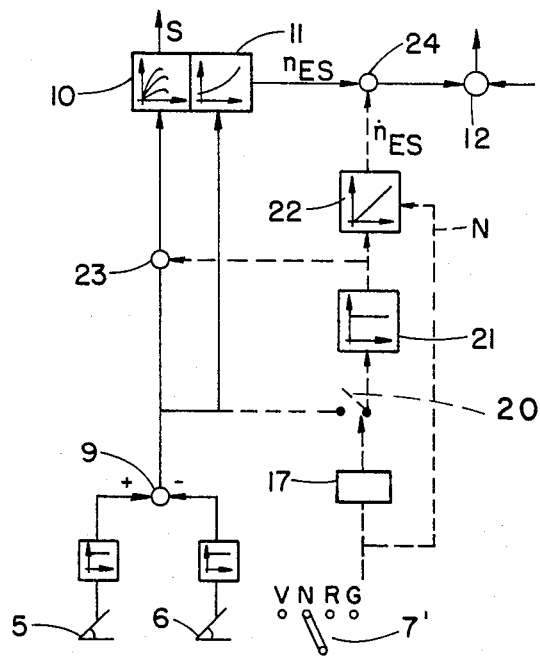
FIGS. 2 and 3 respectively illustrate details of FIG. 1.

This is exemplified in FIG. 2, in which the broken lines represent the circuit diagram for receiving of the flywheel signals. If the flywheel is to take part in the energy conversion process, a switch 20 is closed by means of selector switch 7' and a logic circuit 17, which effects a release regardless of the energy condition of the flywheel, so as to connect the broken-line shown circuit to the control circuit. In this arrangement the flywheel moment is formed by way of an adaptation function 21 and subtracted from the engine torque (23). From the flywheel moment, which also corresponds to the remaining speed of the flywheel, the change in the input speed $n_{ES}$ is computed through an integrator 22. This speed change is added, at a connecting point 24, to the reference value $n_{ES}$ formed by the speed function generator 11. When the flywheel is cut in or out, the integrator 22 receives an erase signal N to set it to zero.

Figure 3:
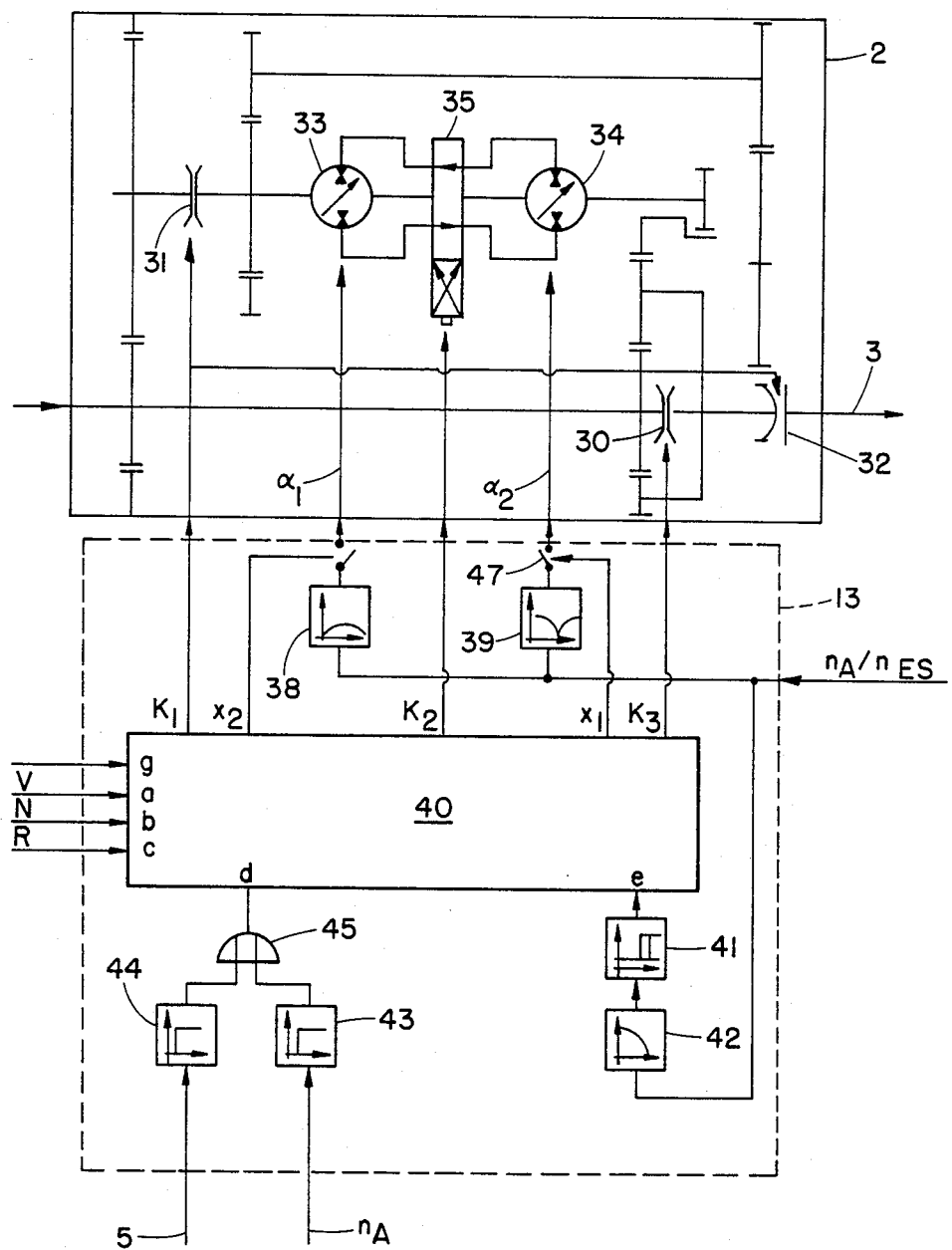

Illustrated in FIG. 3 is a hydrostatic-mechanical power divider transmission 2 having a first coupling 30 two alternately operating couplings 31 and 32, and two hydrostats 33, 34. The hydrostats 33, 34 operate alternately as motor and pump and are interconnected through an actuating valve 35.

The lower half of FIG. 3 illustrates in detail the transmission control unit. It has two function generators 38 and 39 producing the reference values $\alpha_1$, $\alpha_2$ for the pivoting angles of the hydrostats 33 and 34 from the driver signal $n_A/n_{ES}$ for the transmission ratio. The transmission control unit 13 also contains a logic circuit 20 40 and additional functions 41 through 45.

The numeral 41 indicates a hysteresis comparator providing an actuating signal "e" for the changeover of the couplings 30–32. The comparator 41 is attuned such that at a value $n_A/n_{ES}$ of the transmission ratio corresponding to the changeover point, in effect, when the hydromotor 33 is in a zero angular position, it will cause the couplings to change over. The comparator 41 receives the transmission ratio reference value signal $n_A/n_{ES}$ delayed by a lowpass filter 42. Delaying the signals by means of these two functions 41, 42 serves to suppress rapid change signals given by the vehicle operator, such as possible alternating operations of the accelerator pedal, and also superimposed vibrations, by means of a corrective signal $\epsilon$ to prevent unnecessary shifting operation.

Circuits 43 to 45 prevent creep movement at standstill, which is a notorious phenomenon of some automatic transmissions. This produces a signal d equal to zero when both functions 43 and 44 supply zero signals. This is the case when the accelerator pedal 5 is not being operated and when the vehicle is at a standstill, in effect, when $n_A = 0$. By means of logic circuit 40 a signal $x_1 = 0$ will be formed so as to open a switch 47 and interrupt the drive from hydrostat 34, so that movement and, consequently, vehicle creep is effectively prevented. When the threshold 43 is crossed by the movement of the vehicle, or the threshold 44 by depressing the accelerator, or when both thresholds are crossed, a signal d and, accordingly, a signal $x_1$, is formed so as to close the switch 47. During this process, the hydrostat 34 is driven in the intended manner by the reference value signal $n_A/n_{ES}$.

The logic circuit 40 also receives input signals a to c from the selector switch 7, and further signals which are combined with g. These can be used, for example, for indication of the signal for the control oil pressure $g_1$ and the starting cycle $g_2$.

In the logic circuit the input signals a to e and g, or $g_1$ and $g_2$, are linked as follows: when the logic circuit 40 receives a signal $g_1$ indicating the presence of oil pressure, and a signal d, as described above, it enables the drive to the hydrostat 34 by forming the signal $x_1$ when a signal a or c is being received, in effect, when the vehicle is in a specific gear.

An equivalent signal $x_2$ for the control actuating circuit $\alpha_2$ for the second hydrostat 33 is formed if the oil pressure is signaled by $g_1$ and a delay period t-j has elapsed after a change in control conditions, which is indicated by the signal e.

The logic circuit 40 also provides three reference signals $K_1$, $K_2$ and $K_3$ for the couplings 31 (or 32) and 30, or for the valve 35.

The coupling 31 (or 32) is operated by means of reference signal $K_1$ if the oil pressure is correct and no starter position is present, in effect, if no signal $g_1$ and no signal $g_2$ are being received.

The valve 35, which cross-connects the connecting lines of the hydrostats 33 and 34, is controlled from the reference signal $K_2$. In forward gear V (signal a) the signal $K_2$ reference is equal to the signal $K_1$ when the valve 35 operates in the same manner as the coupling 31. In reverse gear R (signal c) the valve 35 operates opposite to the coupling 31.

The logic operations described above can be summarized as follows:

$x_1 = g_1 \wedge (a \vee c) \wedge d$ $x_2 = g_1 \wedge (a \vee c) \wedge (e = e_{t-j})$ $K_1 = g_1 \wedge \overline{g}_2 \wedge \overline{e}$ $K_2 = (K_1 \wedge a) \vee (\overline{K}_1 \wedge b)$ wherein $\wedge$ = and, $\vee$ = or, $-$ = not.

What is claimed is:

1. In a method for controlling a motor vehicle power unit including an internal combustion engine, a variable-ratio transmission, and actuating elements to manipulate the transmission ratio and the fuel supply to the internal combustions engine, the improvement comprising:
   using operating control means to directly affect, one, an engine function generator for the fuel supply and in which engine functions are stored, and two, a speed function generator in which the optimum engine speed is stored;
   generating a first reference signal from the speed function generator;
   sensing the speed at the transmission output by means of a single sensor;
   generating a second reference signal indicative of said transmission output speed;
   electronically dividing the first reference signal by the second reference signal in an electronic transmission control unit to form a reference signal of the transmission ratio; and
   motivating the actuating elements so that the torque of the internal—combustion engine is electronically controlled in response to the fuel infeed and the engine speed is electronically controlled in response to the transmission ratio of the transmission.

2. Method as claimed in claim 1 wherein said operating control means includes at least a selected one of an accelerator pedal and a brake pedal.

3. Method as claimed in claim 1 further including the step of using an output signal of the engine function generator to control a choke or a control lever of a fuel supply system of the internal combustion engine.

4. Method as claimed in claim 1 further including the step of triggering a series of successive control commands in the transmission control unit during transmission control sequences pursuant to a preset schedule.

5. Method as claimed in claim 1 further including the step of processing the first reference signal together with signals from a control panel of the vehicle and in conjunction with further signals generated by the current condition of the transmission to form actuating signals for the transmission ratio.

6. Method as claimed in claim 5, further including the step of using the actuating signals to produce an effect on the pivot angle of hydrostats and couplings of the transmission.

7. Method as claimed in claim 1 further including the step of forming actuating signals for the interal combustion engine and the transmission ratio through final output elements containing underlying actuating circuits.

8. Method as claimed in claim 1, wherein the output rate of a flywheel is influenced proportionately to the intended output by controlling the change in transmission ratio.

9. Method as claimed in claim 1 further including the step of adding a corrective signal to the reference signal of the transmission ratio to allow for concommitant effects.

10. Control device for controlling a motor vehicle power unit consisting of an internal combustion engine and a variable-ratio transmission, comprising
an engine function generator and a speed function generator connected at their input ends to operating controls and at their output ends to engine actuating elements, the speed function generator generating a first reference signal,
a speed sensor (4) arranged at the transmission output end and generating a second reference signal,
means receiving the first and second reference signals and dividing the second reference signal by the first reference signal to form a reference signal of the transmission ratio; and
an electronic transmission control unit receiving the reference signal of the transmission ratio for computing actuating signals for the transmission as a function of the reference signal of the transmission ratio.

* * * * *